Dec. 6, 1949     C. E. BARTHEL     2,490,248

FISH LURE

Filed Nov. 23, 1946

INVENTOR.
Charles E. Barthel
BY his Atty.
John H. McKenna

Patented Dec. 6, 1949

2,490,248

UNITED STATES PATENT OFFICE 2,490,248

FISH LURE

Charles E. Barthel, Gardner, Mass.

Application November 23, 1946, Serial No. 712,018

4 Claims. (Cl. 43—42.12)

This invention relates to improvements in fish lures.

More particularly it relates to fish lures in the form of a simulated animal having legs, such as a mouse, for example, and the invention provides improved means for simulating life-like leg movements as the lure is drawn or otherwise is caused to travel in a body of water.

It is among the objects of the invention to provide a fish lure having a body shaped of any suitable material to simulate the body of a mouse, such as a field mouse, and having rotatable transparent or translucent disks formed to rotate as the lure moves through a body of water, and having generally opaque simulated legs on the disks creating an impression of a swimming mouse as the lure is drawn or otherwise travels through the water.

Another object is to provide an inexpensive and life-like lure having louvered generally transparent disks rotatable in response to movements of the lure in a body of water, the disks having generally opaque portions for creating an impression of animation of the lure as the disks are caused to rotate.

It is, moreover, my purpose and object generally to improve the structure and life-like characteristics of fish lures and more especially such lures made in simulation of animals having legs.

Figure 1:
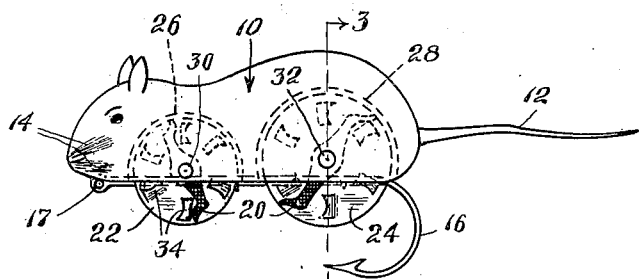
Fig. 1 is a side elevation of a fish lure embodying features of the invention.

Referring to the drawing, the lure as represented has a body 10 formed to simulate the body of a field mouse or the like. Body 10 may be of any suitable material, such as wood, rubber or any of the available plastic or composition materials. The body may have mouth, eyes and ears provided in any convenient or desired manner, and a flexible tail 12 may be of rubber or other suitable material. Also, to enhance the life-like character of the lure, suitable whiskers 14 may be glued or otherwise secured to the head portion of the body. A hook 16 is secured to the under side of the body 10 as by staples 18 or other comparable fastening means.

According to the invention, simulated legs are painted or otherwise visibly displayed as at 20 on disks 22, 24. While I have shown four disks, two front disks 22 and two rear disks 24, it will be obvious that a single front disk 22 and a single rear disk 24 will serve to good advantage.

Figure 2:
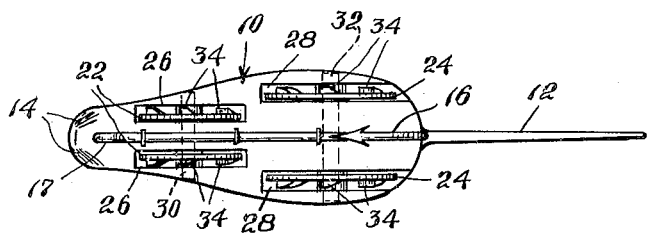
Fig. 2 is a bottom plan view of the lure of Fig. 1.

The body 10 is deeply grooved at its under side for reception of the disks 22, 24. In the illustrated embodiment, there are two front grooves 26 and two somewhat larger rear grooves 28. Each front disk 22 is rotatably mounted in one of the front grooves 26, being pivotally supported at 30 in the body 10. Conveniently the pivot 30 for both front disks may be a single pin passing through the body as best seen in Fig. 2. However, a substantial portion of each disk 22 projects out of its groove 26 for a purpose which will appear.

The rear disks 24, somewhat larger in diameter, are similarly rotatably mounted in the rear grooves 28, pivotally supported in body 10 as at 32, and having substantial projection out of grooves 28.

It is a feature of the invention that the disks 22, 24 are of transparent or suitably translucent material so that the portions thereof which project below body 10 will be substantially invisible when the lure is submerged in water. The disks may be of glass or mica but preferably will be of a plastic material which can be tough and stiff and which can be made transparent or translucent to a desired degree. The representation of the legs 20 on each disk preferably will be generally opaque so that they will be readily visible on the transparent relatively invisible body of the disk, and each disk is formed with louvers 34 or the like which cause the disks to rotate when the lure is moved through a body of water. The representations of legs 20 may be painted on the disks or may be decalcomanias. In fact the invention embraces any manner of providing a readily visible representation of legs on rotatable elements which otherwise are generally invisible in water, to attain an animated effect of a swimming mouse, or the like. Similarly the means for causing rotation of the disks may be projecting ridges or may be laterally displaced portions of the disk stock. Of course, the representation of legs 20 on the disks may be varied as to the number of legs and as to shape of the legs, as may be desired.

Figure 3:
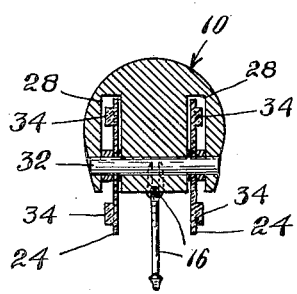
Fig. 3 is a cross-sectional view on line 3—3 of Fig. 1.
Figure 4:
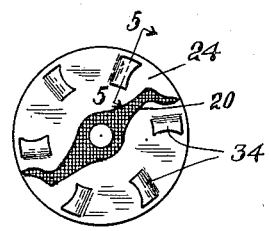
Fig. 4 is a view of one of the rotatable disks on a larger scale.
Figures 5, 6, 7:
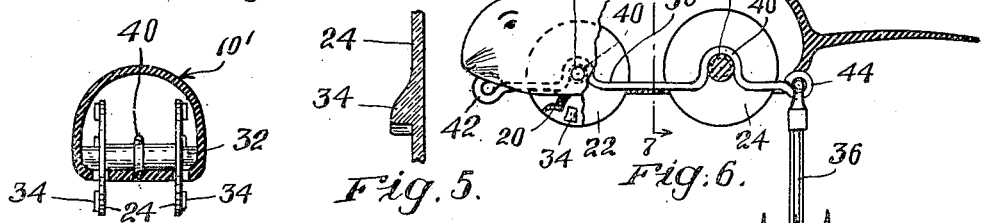
Fig. 5 is a fragmentary cross-sectional view on line 5—5 of Fig. 4 on a still larger scale.
Fig. 6 is a side elevation of a modified form with a portion of the hollow body wall broken away.
Fig. 7 is a cross-sectional view on line 7—7 of Fig. 6.

In Figs. 6 and 7, I have represented a modification in which a plural hook member 36 is swivelled on the rear end of a rod 38 which may be embedded in the under wall of the body 10' of the lure, which body may be hollow as in Figs. 6 and 7 or generally solid, as in Figs. 1-3. Rod 38 may have U-shaped bends 40 for passing over the pins or axles 32 of the disks 22, and conveniently may be provided at its forward end with a loop 42 for convenience in attaching the lure to a line, and may have a similar loop 44 at its rear end for the said swivel connection of hook member 36.

In use, the lure may be drawn through a body of water by means of a line conveniently attachable to the loop 17 of the hook 16 or to the loop 42 of rod 38. The louvers 34 or the like in disks 22, 24 cause the disks to rotate, and the legs 20 intermittently become visible on the generally invisible portions of the disks which project below the body 10, providing a life-like simulation of a swimming mouse.

It should be understood that the invention is applicable to lures whose bodies may simulate various animals, or other fish bait, where it is desirable to create the effect of a swimming animate bait.

I claim as my invention:

1. A fish lure comprising an inanimate member shaped to simulate an animate body which simulated animate body is of a variety having propulsive members for propelling it through water, a rotatable element mounted on said inanimate member and having the character that it is generally invisible in water, means on said element for rotating the element when said member is moved through water, and readily visible means on said generally invisible element simulating the propulsive members of said simulated animate body.

2. A fish lure comprising a body having the general shape of the body of a mouse, a pair of generally transparent disks rotatably mounted on said body, one in advance of the other with a substantial portion of each disk projecting at the under side of the body, means on each disk for causing the disk to rotate when said body is moved through a body of water, and generally opaque means on said disks simulating the legs of a mouse and intermittently visible on said projecting portions of the disks when the disks are rotated in water, said generally transparent disks being otherwise generally invisible in water.

3. A fish lure comprising an inanimate body having the general shape of a simulated animate body, said inanimate body having a relatively deep groove therein at its under side at a forward location on the body and having a relatively deep groove therein at its under side at a rearward location on the body, a pair of disks rotatably mounted each in one of said grooves with substantial projection at said under side of the inanimate body, means on each disk whereby the disks rotate when said inanimate body is drawn through water, said disks having the character of being generally invisible in water, and means on each disk readily visible in water simulating propulsive members of said simulated animate body and intermittently visible on said projecting portions of the disks when the disks are rotated.

4. A fish lure comprising a body having the general shape of the body of a mouse, said body having a pair of grooves in its under side forwardly on the body and having a pair of grooves in its under side rearwardly on the body, a fish hook secured to said under side of the body with its loop end at the forward end of the body, a pair of disks each rotatably mounted in a different one of said forward grooves, a second pair of disks each rotatably mounted in a different one of said rearward grooves, all of said disks being generally transparent so as to be substantially invisible in water, and each disk projecting substantially from its groove at said under side of the body, means on each disk for rotating it as the body is drawn through water, and simulated legs of a mouse on each said disk and intermittently readily visible on said projecting portions of the disks when said disks are rotated by movement of the body through water.

CHARLES E. BARTHEL.

REFERENCES CITED

The following references are of record in the file of this patent:

UNITED STATES PATENTS

| Number | Name | Date |
|--------|------|------|
| 280,318 | Marquart et al. | June 26, 1883 |
| 489,110 | Welch | Jan. 3, 1893 |
| 998,285 | Ekelund | July 18, 1911 |
| 1,212,332 | Ensign et al. | Jan. 16, 1917 |
| 1,313,476 | Ewert | Aug. 19, 1919 |
| 1,959,493 | Muller | May 22, 1934 |
| 2,430,114 | Helmus | Nov. 4, 1947 |